United States Patent Office 3,361,800
Patented Jan. 2, 1968

3,361,800
PROCESS FOR PRODUCING CUMIC ACID
John Howard, Edmonton, Alberta, Canada, assignor to Rayonier Incorporated, New York, N.Y., a corporation of Delaware
No Drawing. Filed Aug. 27, 1964, Ser. No. 392,594
5 Claims. (Cl. 260—515)

This invention relates to the production of cumic acid from thujic acid, and has for its object the provision of an improved process for the molecular rearrangement of thujic acid to cumic acid. The invention provides a practical and economical process for producing cumic acid (p-isopropyl-benzoic acid) in relatively high yield.

Thujic acid occurs naturally as a component of western red cedar (*Thuja plicata* Don) wood and is obtained therefrom by methods involving steam distillation and/or solvent extraction. In pure form it is relatively unstable, odorless, and exists as large colorless crystals.

At the present time, thujic acid has no known commercial applications of any importance. Cumic acid, on the other hand, has substantially the same utility as the other benzoic acids. E. C. Sherrard and A. B. Anderson reported (J. Am. Chem. Soc., 55, 3813-19—1933) that thujic acid could be quantitatively rearranged to cumic acid by refluxing it in a mixture of 3 percent hydrochloric acid containing enough acetic acid to bring about solution of said thujic acid. Later, J. Gripenberg (Acta Chem. Scand. 3, 1137-46—1949) tried, without success, to duplicate the Sherrard et al. conversion. He found that it was necessary to reflux the thujic acid with a mixture of concentrated hydrochloric and acetic acids. Even then the yield was poor, never amounting to over about 40 percent based on the thujic acid. The cost of the chemicals and heat, coupled with the extremely corrosive nature of the reagents and the poor yield, rendered the Gripenberg process impractical from a commercial viewpoint.

This invention is based on the discovery that thujic acid can be rearranged (isomerized) to cumic acid by means of concentrated sulfuric acid at a low temperature to cumic acid in high yield. My procedure consists in mixing the thujic acid with an excess of strong sulfuric acid which dissolves the thujic acid readily to give a greenish yellow solution. The rearrangement takes place spontaneously with little or no evolution of heat and is essentially complete within ten minutes, followed by precipitation of a yellow solid. By keeping the temperature low as by the addition of ice to the reaction mixture, the rearrangement results in the formation of the theoretical amount of crude product which consists of approximately 80 percent cumic acid. Upon recrystallization from an organic solvent such as light petroleum, pure cumic acid has been obtained in 60 percent yield under optimum conditions. Optimum conditions for the conversion were found to be solution of the thujic acid in an excess of sulfuric acid having a concentration of about 89 percent (sp. gr. 1.8087 at 20° C.) at an initial temperature of from 2 to 5° C., and a maximum temperature during conversion of not over 20° C. Conversion is complete under these conditions within about 10 minutes.

Conversion of the thujic acid to cumic acid can be obtained using sulfuric acid ranging in concentration from about 83 to 92 percent, initial temperatures ranging from about 0 to 25° C. and maximum temperatures during conversion up to about 45° C., the higher temperatures being required for the lower sulfuric acid concentrations and vice versa. Any substantial deviations from the indicated optimum conditions, however, are detrimental to both yield and purity of the cumic acid product, and particularly if the maximum temperature is allowed to rise above about 30° C. Sufficient concentrated sulfuric acid must be in every case to completely dissolve the thujic acid, but large excesses are not especially beneficial and make separation and recovery of the product more difficult.

The following is an example of rearranging thujic acid to cumic acid by a process of the invention.

Ten parts of thujic acid was dissolved in 90 parts by weight of 89 percent sulfuric acid (sp. gr. 1.8087 at 20° C.) while stirring in an ice bath. The maximum temperature reached was 20° C. and thus dropped to 0° C. on standing one hour. Crystals started to separate 2 to 5 minutes after the thujic acid was dissolved. After one hour the mixture was filtered on a sintered glass filter and washed with 18 parts of cold 75 percent sulfuric acid followed by washing with distilled water. After drying in air the yield was 6.2 parts of white crystals which melted at 112–115° C.

Tests were carried out to show the effects of sulfuric acid concentration and temperature in the isomerization of thujic acid to cumic acid. 10.0 g. thujic acid was added to 50 ml. of the sulfuric acid, using hand stirring with a thermometer, and with ice bath cooling for the higher strength acids. After reaction, the products were allowed to stand for an hour, and then filtered without dilution in sintered glass vacuum funnels, washed with 10 ml. 75 percent $H_2SO_4$, and then washed with distilled water.

| Expt. | Percent $H_2SO_4$ | Temperatures, ° C. | | | | Yield, percent | M.P., ° C. |
| --- | --- | --- | --- | --- | --- | --- | --- |
| | | Initial | Peak | Final | Cryst.[1] | | |
| 1 | 92 | 1 | 23 | 0 | 6 | 42 | 113–116 |
| 2 | 89 | 3 | 20 | 0 | 18 | 62 | 112–115 |
| 3 | 86 | 5 | 30 | 0 | 24 | 55 | 110–114 |
| 4 | 83 | 23 | 43 | 20 | 40 | 55 | 104–111 |

[1] Temperature at which cumic acid was observed to start crystallizing out.

In experiments 1 to 3, complete solution of the thujic acid occurred, concurrent with a rapid (one minute) rise in temperature. The dissolution was perhaps not quite complete in the case of the last run, where the onset of crystallization was particularly sudden and heavy. The acid filtrates were mild-brown in color, and the acid washes decreased in color, the last few drops being straw color. The precipitates were very light colored after the acid wash, and became white on water washing. The recorded melting point of pure cumic acid is 116° C.

I claim:
1. The improved process for the rearrangement of thujic acid to cumic acid which comprises mixing thujic acid with 83 to 92 percent sulfuric acid at a temperature below 45° C., forming crystals of cumic acid, and separating and purifying the crystals of cumic acid.

2. In the process of claim 1 mixing the thujic acid with about 89 percent sulfuric acid at a temperature below 20° C.

3. In the process of claim 1, purifying the crystals of cumic acid by first washing them with more dilute sulfuric acid than is used to form the cumic acid, and then washing the cumic acid crystals with water.

4. The improved process for the rearrangement of thujic acid to cumic acid which comprises mixing thujic acid with 83 to 92 percent sulfuric acid at a temperature below 20° C. when the sulfuric acid is about 92 percent and below 45° C. when the sulfuric acid is about 83 percent, forming crystals of cumic acid, separting the crystals of cumic acid, and washing the crystals with more dilute sulfuric acid than is used to form the cumic acid.

5. The process of claim 4 in which the sulfuric acid is about 89 percent and the rearrangement is carried out at a temperature of from 2 to 5° C.

References Cited

Sherrard et al.: J. Am. Chem. Soc., 55 (1933) 3813–19.
Gripenberg: Acta Chem. Scand., 3 (1949) 1137–46.

LORRAINE A. WEINBERGER, *Primary Examiner.*

M. WEBSTER, *Assistant Examiner.*